United States Patent [19]

Hudson et al.

[11] Patent Number: 4,969,318
[45] Date of Patent: Nov. 13, 1990

[54] REMOTELY OPERABLE LUBRICATION SYSTEM FOR A HARVESTER

[75] Inventors: Allen D. Hudson, Carlisle; Steve H. McBee; Joel M. Schreiner, both of Ankeny, all of Iowa

[73] Assignee: Deere & Company, Moline, Ill.

[21] Appl. No.: 406,940

[22] Filed: Sep. 13, 1989

[51] Int. Cl.⁵ ............................................. A01D 46/08
[52] U.S. Cl. ..................................... 56/10.2; 56/10.8; 56/28; 184/6.1
[58] Field of Search ................... 56/10.2, 10.8, 28, 36, 56/49, 40, 41, 42, 43, 44, 45, 46, 47, 48, 50, 29, 30, 31, 32, 33, 34, 35, 37, 38, 39; 60/427, 494, 444; 184/6.1, 7.3

[56] References Cited

U.S. PATENT DOCUMENTS

| | | | |
|---|---|---|---|
| 4,727,710 | 3/1988 | Kuhn | 56/10.2 |
| 4,759,185 | 7/1988 | McConnell et al. | 56/10.2 |
| 4,769,978 | 9/1988 | Reichen et al. | 56/12.3 |

*Primary Examiner*—Ramon S. Bitts
*Assistant Examiner*—Terry L. Melius

[57] ABSTRACT

A tether switch is connected to both the operator presence system and the automatic lubrication distribution system on a harvester such as a cotton picker. A lubrication control switch on the instrument panel of the harvester is connected to the tether switch and to the lubrication control and is switchable to a first condition wherein depression of the tether switch activates driven components on the harvester and the lubrication system to cause lubrication to be pumped to the moving components. The tether switch may be moved between harvester cab and harvester unit locations so that, when the control switch is in the first condition, the operator can cause the units to be lubricated while he watches the driven components from a location remote from the cab. The operator presence and lubrication systems are fully integrated with each other, and the presence system includes condition responsive switches connected such that the operator may activate the lubrication distribution system with the control switch without depressing the tether switch when he is in his seat in the cab.

8 Claims, 2 Drawing Sheets

REMOTELY OPERABLE LUBRICATION SYSTEM FOR A HARVESTER

BACKGROUND OF THE INVENTION

1. Field of the Invention:

The present invention relates generally to lubrication systems, and more specifically to improvements in automatic lubrication systems for harvesters.

2. Related Art:

Harvesters such as cotton pickers include a large number of lubrication points which must be serviced at regular intervals to prevent premature failure of moving components. U.S. Pat. No. 4,769,978, assigned to Deere & Company, describes a system for distributing lubricant to numerous locations on the row units of a cotton harvester. Such a system is presently on commercially available harvesters such as the John Deere model 9950 Cotton Picker and has significantly reduced the time and effort necessary to lubricate the machine. However, the need to inspect the lubrication areas coupled with the requirement that the row units be driven during the greasing cycle has heretofore required either that a second person be present during lubrication or that the operator leave the harvester cab and shut off drive to the units to climb down to the ground to inspect areas inside the units. Numerous inspection trips may be required during a greasing cycle. Failure to inspect can result in wasteful overgreasing and contamination of harvested cotton, or in undergreasing which decreases the service interval.

Recently, a service bypass circuit which is described in U.S. Pat. No. 4,759,185 has been made available which permits the operator to selectively bypass the operator presence system on a harvester to slowly drive the row units for inspection under certain restricted conditions. However, the lubricant distribution system has heretofore required the operator to be in the cab at the control panel to activate the lubrication cycle.

BRIEF SUMMARY OF THE INVENTION

It is therefore an object of the present invention to provide an improved lubrication system for a harvester. It is a further object to provide such a system which overcomes the aforementioned problems.

It is still another object of the invention to provide an improved lubrication system for a harvester such as a cotton picker wherein the system is conveniently operable from either the harvester cab or from a remote location adjacent the area being lubricated so that the operator may visually inspect the areas during lubrication. It is another object to provide such a system which is integrated with the operator presence system on the harvester to permit the components to be driven under certain conditions during lubrication while the operator is away from the cab.

It is yet a further object of the invention to provide an improved lubrication system for the row units of a cotton harvester which provides automatic lubrication of the units and eliminates the need for the operator to make numerous inspection trips to and from the cab during a greasing cycle. It is a further object of the invention to provide such a system wherein the operator may selectively drive the row units at reduced speed while he inspects the lubrication areas, during the lubrication process, at a location remote from the cab.

A lubrication system constructed in accordance with the teachings of the present invention includes a remote control tether switch which is movable between the operator station and remote locations and is connected to both the lubrication circuit and an operator presence system. The lubrication circuit includes a switch located on the operator control panel for selecting the lubrication function, whereupon depression of the tether switch activates drive to the components to be lubricated and at the same time causes engagement of a lubrication pump clutch. If the operator is at a location remote from the operator station (for example, at a position where he can view the components that are to be lubricated), the tether switch will override the operator presence system, provided the operator controls are in certain preselected conditions, so that the components will be driven slowly. Therefore, the operator can lubricate the components while observing from the ground as the components are in motion. When the lubrication switch is off, the tether switch may still be utilized to drive the components slowly for inspection when the controls are in the preselected conditions. The operator presence and lubrication systems are fully integrated with each other, and the presence system includes condition responsive switches connected such that the operator may, under certain conditions, activate the lubrication distribution system with the control switch without depressing the tether switch when he is at the controls in the cab.

DETAILED DESCRIPTION OF THE DRAWINGS

Figure 1:
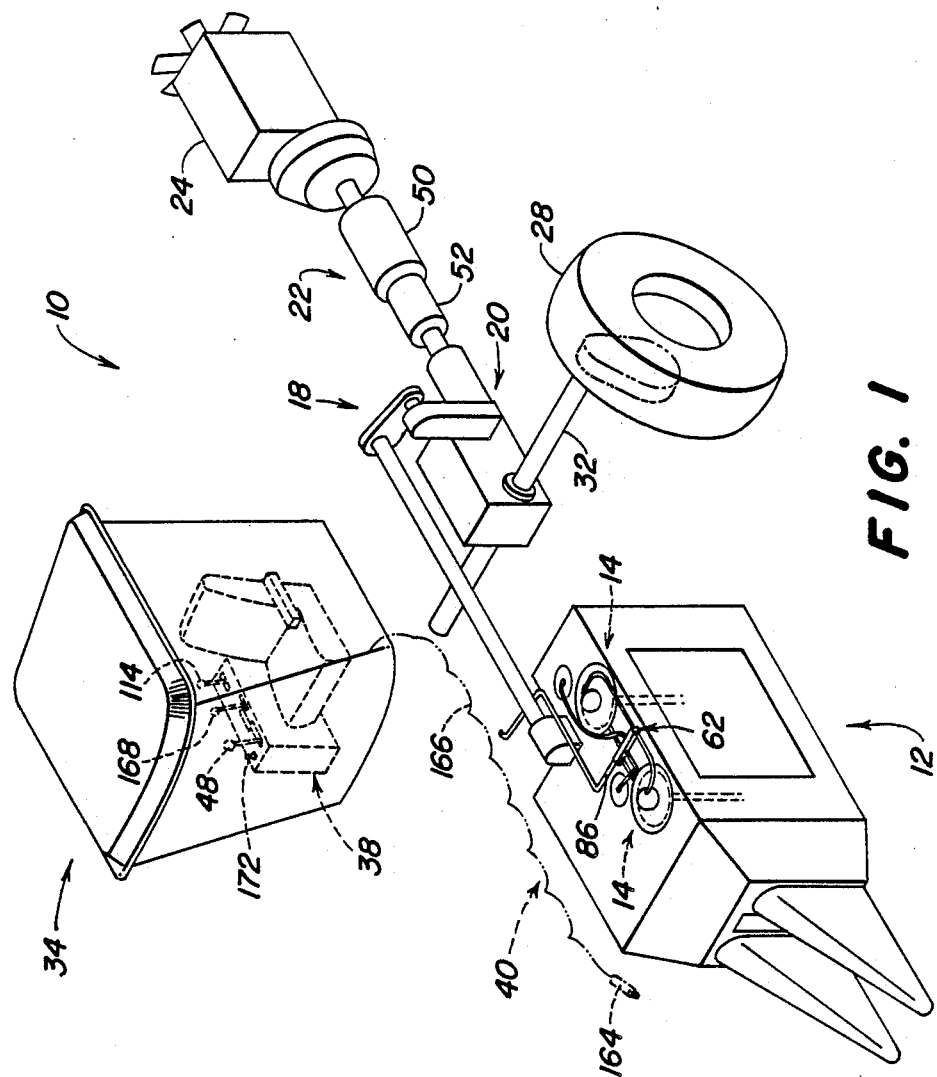
FIG. 1 is a schematic representation of a portion of a harvester with the lubrication system of the present invention attached thereto.

Referring now to FIG. 1, therein is shown a portion of a harvester 10 having a forward harvesting unit 12 with driven components 14 connected through a unit drive 18 to a transmission 20. The transmission 20 is connected through a hydrostatic drive 22 to an engine 24. Ground wheels 28 support the forward end of the harvester 10 and are connected through an axle 32 to the transmission 20 for moving the harvester over a field of plants. The speed of the driven components 14 (including upright picker drums) is synchronized through the transmission 20 with the forward speed of the harvester 10. A cab or operator station 34 having an operator control console 36 is located rearwardly above the unit 12. As shown in FIG. 1, the harvester 10 is a cotton picker and includes an operator presence and service bypass system 40 generally of the type described in the aforementioned U.S. Pat. No. 4,759,185.

Figure 2:
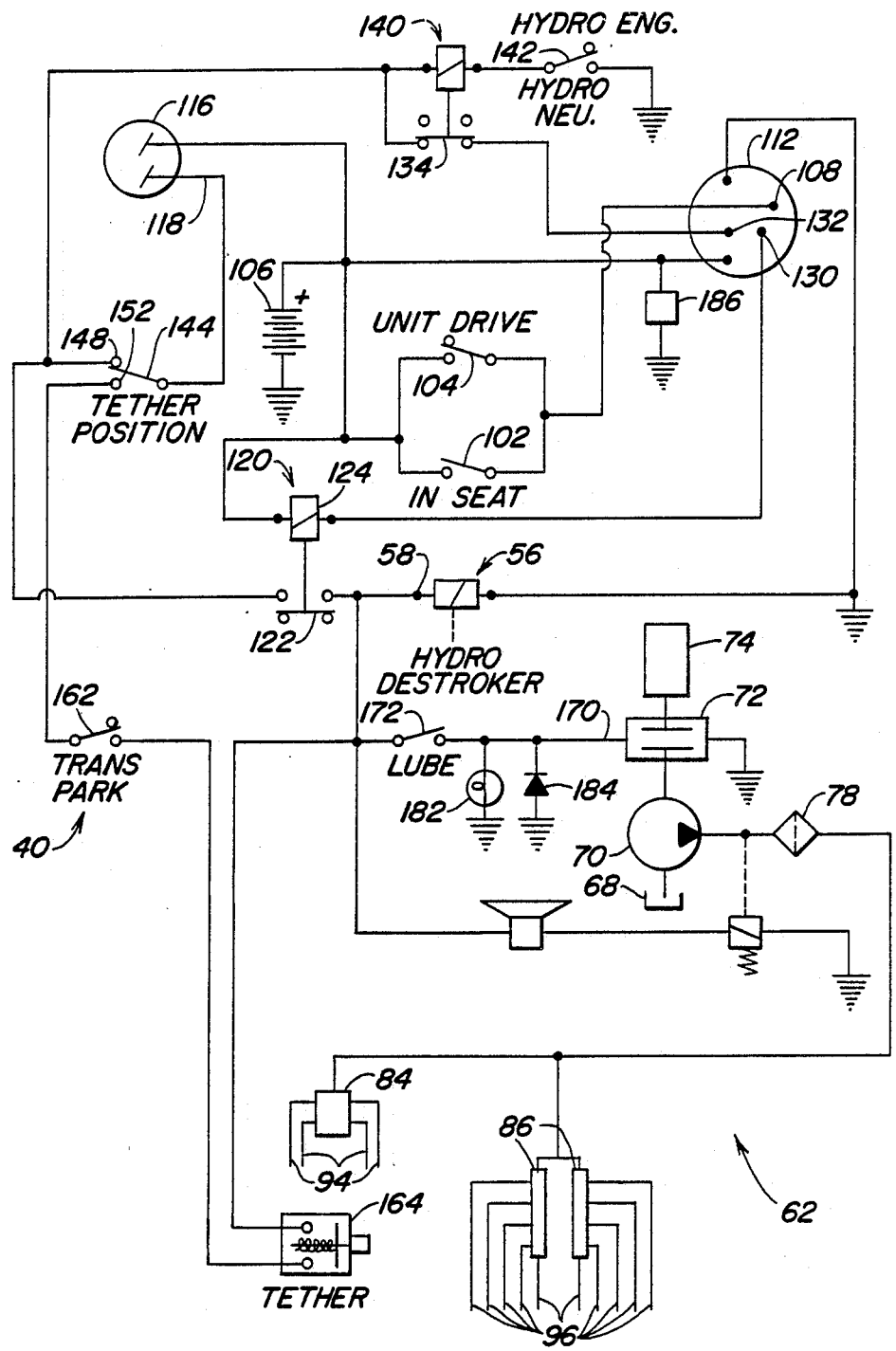
FIG. 2 is a schematic representation of the operator presence system on the harvester of FIG. 1 and showing the lubrication circuit to the remote control tether switch.

The hydrostatic drive 22, which is also described in U.S. Pat. No. 4,759,185, is controlled in a conventional manner by a speed control lever 48 located at the console 36 which determines the amount of tilt on a swashplate (not shown) of a variable displacement pump 50. A flow of oil, determined by the swashplate tilt, is directed to a fixed displacement motor 52 to drive the transmission 20. A destroker circuit 56 with an input terminal 58 (FIG. 2) which is normally at the positive supply voltage during operation is utilized to return the swashplate to the neutral position and disconnect the drive whenever power is removed from the terminal 58. The destroker is of conventional design such as described in the aforementioned U.S. Pat. No. 4,759,185.

The harvester 10 also includes a lubrication distribution system 62 generally of the type shown in the aforementioned U.S. Pat. No. 4,769,978 but which is operably connected to the operator presence system 40 as will be described in detail below. The system 62 includes a source of lubricant 68 on the harvester connected to the input of a lubricant pump 70. The pump 70 is connected through an electrically operated clutch 72 to a drive source 74 (which may be the engine 24). The output of the pump 70 is connected through a line filter 78 to distribution manifolds 84 and 86. Lines 94 and 96 direct lubricant from the respective manifolds 84 and 86 to the various driven components 14 on the unit 12.

The operator presence system 40 includes a normally open seat switch 102 and a unit drive switch 104 connected in parallel between the positive terminal of a battery 106 and an input terminal 108 of a delay and control circuit 112. The switch 102 is closed when the operator assumes his position on the seat in the cab 34. The switch 104 is operably connected to a unit engagement lever 114 and is closed when the lever is positioned to disengage the unit drive 18. If the operator leaves his seat with the unit drive engaged (switches 102 and 104 will both be open), the circuit 112 will after a short delay cause the destroker to return the hydraulic drive to neutral.

A key switch 116 has an input terminal connected to the positive terminal of the battery 106 and a switched output connected to a line 118.

A destroker relay 120 includes a normally open switch 122 and a solenoid 124 connected between the battery 106 and a terminal 130 of the control circuit 112 which is responsive to the voltage level at a control input terminal 132. When the destroker relay switch 122 is closed (the relay 120 is activated), the destroker 56 is activated to assure that the hydrostatic drive 22 is in the normal drive condition. The terminal 130 will be grounded if the control terminal 132 is at a positive voltage with respect to ground. Therefore, the relay 120 will be deactivated to open the switch 122 and return the hydrostatic drive to neutral in the absence of a positive voltage applied to the terminal 132. In addition, if both the operator presence switch 102 and the unit engagement switch 104 are open, the circuit 112, after a short delay, will also cause the terminal 130 to be ungrounded and will return the hydrostatic drive to neutral.

The control terminal 132 is connected to an output terminal of a normally closed switch 134 of a relay 140. The solenoid of the relay 140 is connected between first and second hydraulic control lever switches 142 and 144, the conditions of which are determined by the position of the speed control lever 48. The switch 142 is closed and connects one of the solenoid leads to ground when the lever 48 is in the neutral position. The other solenoid lead is connected to one output contact 148 of the switch 144 which is normally connected through the switch 116 to the battery 106 during operation so that the solenoid 140 will cause a positive voltage to be applied to the terminal 132 of the control circuit 112 when the lever 48 is out of the neutral position. With a positive voltage at terminal 132 of the control circuit 112, the terminal 130 is grounded to activate the relay 120 and close the relay switch 122. Moving the hydraulic speed control lever 48 from neutral to engage the hydrostatic drive 22 opens the switch 142 causing the relay 140 to deactivate; the terminal 130 is grounded activating the destroker relay 120 to close the switch 122 and permit normal hydraulic drive.

The switch 144 is responsive to the movement of the speed control lever 48 into a special slow speed tether position in the console which permits unit drive at a very slow speed. When the lever 48 is moved to the tether position, the switch 144 is moved from the position shown in FIG. 2 to the lowermost position thus opening the circuit between the voltage source and the terminal 148 (assuring that the control terminal 132 is low and the destroker switch 122 will be unpowered) and applying source voltage to the terminal 152. A transmission switch 162 is connected in series with a tether bypass switch 164 between the terminal 152 and the terminal 58 of the destroker 56. The transmission switch 162 is open unless the transmission 20 is in neutral (or park). The tether switch 164 is a normally open push button switch connected to the circuit by coiled leads 166 which allow the operator to move the switch 164 from a location in the cab 34 to a remote location adjacent the unit 12. By moving the speed control lever 48 to the special slow speed tether position and placing the transmission lever (see 168 of FIG. 1) in the park position, the switches 144 and 162 will provide a closed path between the source voltage and the tether switch 164 so that upon depression of the switch 164 by the operator, power will be applied to the destroker 56 to permit slow speed operation of the unit 12 when the operator is away from the seat and the seat switch 102 is open. For further details of operator presence and service bypass system operation and hydrostatic drive operation, reference may be had to the aforementioned U.S. Pat. No. 4,759,185.

The electrically operated clutch 72 of the lubrication distribution system 62 is connected by a line 170 to the output terminal of a switch 172 located on the console 38. The input terminal of the switch 172 is connected to the destroker terminal 58 and the tether switch 164. Therefore, the clutch 72 can only be engaged when the destroker circuit 56 is activated for normal hydrostatic drive operation (i.e., the destroker relay switch 122 is closed or a path is completed between the closed key switch 116 and the tether bypass circuit which includes switches 144, 162 and 164). An indicator light 182 located on the console is connected to the line 170, and a diode 184 prevents large negative voltage spikes when the switch 172 is turned off. A transient suppressor 186 is also connected to the positive terminal of the power battery 106. To provide an indication that grease is actually flowing from the pump 70, a pressure responsive switch 190 is connected between ground and an audio signal device 192 such as a chime. The device 192 is connected to the terminal 58, and the pressure of the pumped lubricant closes the switch 190 and activates the signal.

When the operator is sitting on his seat with the unit drive engaged, he may turn on the lube switch 172 and put the hydrostatic drive 22 in forward to begin lubricating the unit 12. If the operator leaves his seat, the switch 102 will open and the relay 120 will deactivate after the short delay to cause the destroker circuit 56 to shut down the hydrostatic drive. However, if the operator wishes to inspect the unit components at a remote location during the lubrication, he may do so by turning on the lube switch 172, and positioning the hydrostatic drive lever 48 in the special tether location and placing the transmission in park so that the switches 144 and 162 close a path between the closed key switch 116 and the tether switch 164. The operator then removes the tether switch 164 from a holder in the cab 34 and carries it to the location where he can view the components that are to be lubricated. Thereafter, depression of the tether switch 164 supplies power to the destroker circuit 56 and the lubrication circuit 62 to engage the hydrostatic drive 22 and activate the clutch 72 so that the unit drive operates at a very slow speed while the pump delivers lubricant to the moving components. The operator therefore can view the areas being lubricated to assure that enough lubrication is received without contaminating the areas by overlubrication. If for any reason the operator releases the tether switch 164, the destroker circuit 56 will immediately return the hydrostatic drive to neutral to stop the unit drive and the power to the lubrication circuit 62 will be interrupted.

If the operator wishes to inspect the unit while the components are being driven at the slow speed without lubricating the unit, he may simply follow the above procedure while leaving the lube switch 172 open. With the switch 172 open, depressing the tether switch 164 will power the destroker circuit 56 to engage the hydrostatic drive, but the pump clutch will remain disengaged so that no pumping of lubricant occurs.

Having described the preferred embodiment, it will become apparent that various modifications can be made without departing from the scope of the invention as defined in the accompanying claims.

What is claimed is:

1. In a harvester having an engine and an operator station, a harvesting unit located remotely from the station and having components selectively connectible to the engine for drive thereby, activatable lubricant pumping structure for supplying lubrication to components on the harvesting unit, operator presence means for normally removing drive from the components automatically when the operator leaves the station, means for overriding the operator presence means from the remote location to connect drive to the components and thereby facilitate viewing by the operator of the driven components, and means for selectively activating the pumping structure from the remote location including a lubrication control switch switchable to and from a lubrication selecting condition, and means connecting the lubrication control switch to the operator presence means and pumping structure for activating the pumping structure when the lubrication control switch is in the lubrication selecting condition and the operator presence means is overridden from the remote location to thereby permit the operator to view the driven components during lubrication.

2. The invention as set forth in claim 1 wherein the lubrication control switch is mounted at the operator station and the means for overriding includes a tether switch movable between the operator station and the remote location.

3. The invention as set forth in claim 1 wherein the means for overriding comprises a switch selectively operable at either the operator station or the remote location.

4. In a harvester having an engine and an operator station, a harvesting unit located remotely from the station and having components selectively connectible to the engine through a hydrostatic drive for drive thereby, the drive including a hydraulic destroker circuit, an operator presence system for automatically operating the destroker circuit and disabling the hydrostatic drive to remove drive from the components if the operator leaves the operator station, activatable lubricant pumping structure for supplying lubrication to components on the harvesting unit, means for overriding the operator presence system to provide slow speed drive of the components under preselected operating conditions when the operator is away from the station, the means for overriding including a bypass circuit connected to the destroker circuit, switch means located at the operator station, the switch means switchable between first and second conditions, and means for connecting the switch means to the destroker circuit and the pumping structure for activating the pumping structure from the remote location when the operator presence system is overridden and the switch means is in the second condition to thereby facilitate viewing by the operator of the driven components during lubrication and preventing actuation of the pumping structure when the switch is in the first position.

5. The invention as set forth in claim 4 wherein the means for overriding includes a remote control switch located at the remote location.

6. The invention as set forth in claim 5 wherein the switch means is connected in series with the remote control switch and the pumping structure.

7. The invention as set forth in claim 5 wherein the means for overriding further includes a speed selection responsive switch connected to the remote control switch.

8. The invention as set forth in claim 6 wherein the means for connecting the switch means to the destroker circuit and the pumping structure for activating the pumping structure includes means for connecting the switch means and the pumping structure in parallel with the destroker circuit.

* * * * *